(12) United States Patent
De Andrade Chalar Da Silva et al.

(10) Patent No.: US 11,592,798 B2
(45) Date of Patent: Feb. 28, 2023

(54) SYSTEMS AND METHODS FOR CONTROLLING PRODUCTION AND/OR DISTRIBUTION LINES

(71) Applicant: SICPA HOLDING SA, Prilly (CH)

(72) Inventors: Luis Felipe De Andrade Chalar Da Silva, Rio de Janeiro (BR); Diego De Carvalho Costa, Rio de Janeiro (BR); Vitor Dias Pinheiro, Rio de Janeiro (BR); Leonardo Rodrigo Daniel Mattos Alberto Dos Santos, Burke, VA (US)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/478,368

(22) PCT Filed: Nov. 16, 2017

(86) PCT No.: PCT/EP2017/079444
§ 371 (c)(1),
(2) Date: Jul. 16, 2019

(87) PCT Pub. No.: WO2018/130325
PCT Pub. Date: Jul. 19, 2018

(65) Prior Publication Data
US 2019/0332077 A1    Oct. 31, 2019

(30) Foreign Application Priority Data

Jan. 16, 2017    (WO) ................. PCT/EP2017/050785

(51) Int. Cl.
*G05B 19/048*        (2006.01)
*G05B 19/418*        (2006.01)
*H04W 4/70*          (2018.01)

(52) U.S. Cl.
CPC ......... *G05B 19/048* (2013.01); *G05B 19/418* (2013.01); *H04W 4/70* (2018.02); *G05B 2219/1133* (2013.01)

(58) Field of Classification Search
CPC ................ Y02P 90/02; G05B 19/4185; G05B 19/4186; G05B 19/408; G05B 19/41815;
(Continued)

(56) References Cited

U.S. PATENT DOCUMENTS 5,682,476 A * 10/1997 Tapperson ......... G05B 19/4185
                                                      370/225
7,181,674 B2 * 2/2007 Cypher ................... G06F 11/10
                                                      370/392

(Continued)

FOREIGN PATENT DOCUMENTS

AR         101441      12/2016
BR      102014019981    6/2016
(Continued)

OTHER PUBLICATIONS

IO-Link Interface and System Specification V1.1.2, Jul. 2013, published by IO-Link Community, based in Karlsruhe, Germany.
(Continued)

*Primary Examiner* — Darrin D Dunn
(74) *Attorney, Agent, or Firm* — Muncy, Geissler, Olds & Lowe, P.C.

(57) ABSTRACT

A system (100) for controlling a plurality of lines (10), with each line (10) being at least one of a production line and a distribution line, comprises: a first subsystem (30), hereinafter referred to as "master room subsystem", comprising a first control device (40) hosting an OPC UA server (45); and, for each line (10), a second subsystem (50), hereinafter referred to as "line control subsystem", comprising: (a) a second control device (60) on which an operating system is
(Continued)

running, the second control device (60) hosting an OPC UA client (65); (b) at least one field device (70); and (c) a connection device (80) arranged for allowing communication between the field device(s) (70) and the second control device (60). The field device(s) (70) is connected to the second control device (60) through a point-to-point digital communication interface, the second control device (60) having one port per field device (70).

15 Claims, 5 Drawing Sheets

(58) Field of Classification Search
CPC .............. G05B 19/418; G05B 19/4183; G05B 2219/25011; G05B 2219/25032; G05B 2219/25075; G05B 2219/2621; G05B 2219/31229; G05B 2219/25354; G05B 2219/31135; G05B 2219/31145; H04L 12/10; G06F 1/266
See application file for complete search history.

(56) References Cited

U.S. PATENT DOCUMENTS

| | | | | |
|---|---|---|---|---|
| 2007/0019560 | A1* | 1/2007 | Brewer | H04L 12/10 370/252 |
| 2007/0074282 | A1* | 3/2007 | Black | H04L 63/0471 726/14 |
| 2008/0027678 | A1* | 1/2008 | Miller | G05B 23/0297 702/182 |
| 2010/0005336 | A1 | 1/2010 | Jordan et al. | |
| 2014/0040431 | A1 | 2/2014 | Rao et al. | |
| 2014/0208390 | A1 | 7/2014 | Brown et al. | |
| 2014/0303755 | A1 | 10/2014 | Landgraf et al. | |
| 2017/0013064 | A1 | 1/2017 | Knight | |
| 2017/0075344 | A1* | 3/2017 | Spring | G05B 19/0426 |

FOREIGN PATENT DOCUMENTS

| | | | |
|---|---|---|---|
| CN | 104322038 | 1/2015 | |
| CN | 104660682 | 5/2015 | |
| CN | 205844881 | 12/2016 | |
| DE | 102014114750 | 12/2015 | |
| SG | 164955 | 10/2010 | |
| WO | 2007137880 | 12/2007 | |
| WO | 2012079946 | 6/2012 | |
| WO | WO-2015168543 A1 * | 11/2015 | ......... G05B 19/0426 |
| WO | 2016155857 | 10/2016 | |

OTHER PUBLICATIONS

NEON-1020 smart camera from ADLINK Technology Inc., headquartered in Taipei, Taiwan.
EtherNet/IP™—CIP on Ethernet Technology, Technology Overview Series, PUB00138R6, ODVA, Michigan, USA, Mar. 2016, retrieved on Nov. 15, 2016.
International Search Report and Written Opinion dated Feb. 14, 2018 with respect to Application No. PCT/EP2017/079444, 10 pages.
International Preliminary Report on Patentability dated Dec. 14, 2018 with respect to Application No. PCT/EP2017/079444, 29 pages.
Hua Rong, Rockwell Automation Co., How OPC UA Impact Automation, China Instrumentation, 2013, 3 pages.
Notification of First Chinese Office Action in counterpart Chinese Patent Application No. 201780083615.7 dated Jul. 21, 2022 (and English language translation of Office Action).
English translated abstract of AR-101441, Dec. 21, 2016, 1 page.
English translated abstract of BR-102014019981, Jun. 28, 2016, 1 page.

* cited by examiner

SYSTEMS AND METHODS FOR CONTROLLING PRODUCTION AND/OR DISTRIBUTION LINES

TECHNICAL FIELD

The present invention relates to systems and methods for controlling a plurality of lines, wherein each line is a production line, a distribution line, or both. The invention may be used in, without being limited to, the field of industrial production or distribution of goods, such as for example tobacco, beverage, or pharmaceutical products.

BACKGROUND

Many methods exist and are implemented in the industry for controlling production lines and distribution lines, not only for detecting problems arising on transport paths but also for reliably determining a quantity of items produced or distributed. In particular, some of these methods are used for ensuring proper dispatching or packaging of the items, or for allowing accurate billing or tax accounting of the items so produced or distributed.

Imaging devices are common for controlling production of items on automated production lines. For example, on bottling lines, strobe light (using a LED lighting unit controlled by a laser trigger device which detects presence of an item, for example) illuminates bottles transported on a conveyor and marked with a barcode (1D or 2D barcode, like SKU code or Data Matrix, for example), and digital cameras take digital images of the illuminated bottles. A strobe light source typically uses a LED lighting unit controlled by a laser trigger device, which detects the presence of an item. Conventional image processing means then automatically detect on a digital image of an item a region of interest containing a barcode pattern and then identify the item by decoding the detected barcode. Such identification may be used, for example, for correct labelling of the bottles according to their type (or content, etc.). There are many known techniques relating to image processing which can be used for identifying an item marked with an identifier (including item identification data) from a digital image of said identifier.

The above imaging devices, or readers, may be adapted to read identifiers from light reflected or emitted by said identifier within any optical wavelength range between the ultraviolet (UV) and the infrared (IR).

There are also many other well-known techniques adapted to different types of identifiers. For example, a RFID reader is adapted for reading identifiers like RFID tags attached to items, these RFID tags including item identification data (possibly encrypted). As another non-limiting example, the identifier may be a magnetic marking, and the corresponding adapted reader is then of magnetic sensor type.

Thus, whatever specific type of identifier including identification data is used for marking items transported on a production/distribution line, an adapted type of reader is used for reading said identifier and sending a corresponding reader signal to a controller having processing means capable of extracting identification data from said reader signal.

There are also other techniques for controlling production and distribution lines known in the state of the art. For example, WO 2016/155857 A1 discloses an adaptive process control system and a method for independent steering of plant control systems, wherein a plant comprises a plurality of interlocked elements of one or more operational unit of the plant. The adaptive process control system is accessible by a plant process engine comprising a plant controller unit connected via the supervisory control and data acquisition unit with at least one programmable logic controller (PLC) of the plant control system. The operation of the plant and the operational units is controlled by means of the programmable logic controllers (PLC) and interlocked elements.

DE 10 2014 114750 A1 discloses a method and a control device for operating an IO-link communication system with at least one IO-link device connected via an IO-link in one of an SNMP-based network management system, wherein SNMP requests are converted into an IO-Link format by means of a proxy agent arranged in an SNMP device or the at least one IO-Link device is detected and/or operated via at least one SNMP request by means of the proxy agent arranged in the SNMP device.

US 2014/303755 A1 discloses a machine comprising an electrical controller configured to control the machine and/or at least one element of the machine, a provider unit configured to provide a mobile data-display device with data relating to a status of the machine and/or a status of the at least one element controlled by the electrical controller, and a communication device configured for wireless communication with the mobile data-display device.

However, the control of production and distribution lines, in particular when an add-on track and trace solution is used, are often constrained in their implementation by the limited space available on the factory floor. This means that limited space is available to install control equipment, such as a control cabinet, and the wiring to provide power to field devices and enable communication with these devices.

There is a constant need for improving the control of production and distribution lines with in mind the need to provide cheaper solutions, requiring as less space as possible.

SUMMARY

To meet or at least partially meet the above-mentioned goals, systems and methods according to the invention are defined in the independent claims. Particular embodiments are defined in the dependent claims.

In one embodiment, a system is aimed at controlling a plurality of lines, each line being a production line, a distribution line, or both. The system comprises a first subsystem, here referred to as "master room subsystem", comprising a first control device hosting an OPC UA server. Furthermore, the system comprises, for each line, a second subsystem, here referred to as "line control subsystem", comprising: (a) a second control device on which an operating system (OS) is running, the second control device hosting an OPC UA client; (b) at least one field device; and (c) a connection device arranged for allowing communication between the at least one field device and the second control device. The field device(s) are connected to the connection device through a point-to-point digital communication interface, with the connection device having one port per field device.

Such a system eliminates the need to have a dedicated control cabinet per line, so that the system may be cheaper and may require less space and wiring than prior art systems.

The invention also relates, in one embodiment, to a method for controlling a plurality of lines, with each line being, as mentioned above, a production line, a distribution line, or both. The method comprises operating a master room subsystem and a line control subsystem as described above.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to restrict the scope of the invention, which is defined by the appended claims. A list of abbreviations and their meaning is provided at the end of the detailed description.

Figure 1:
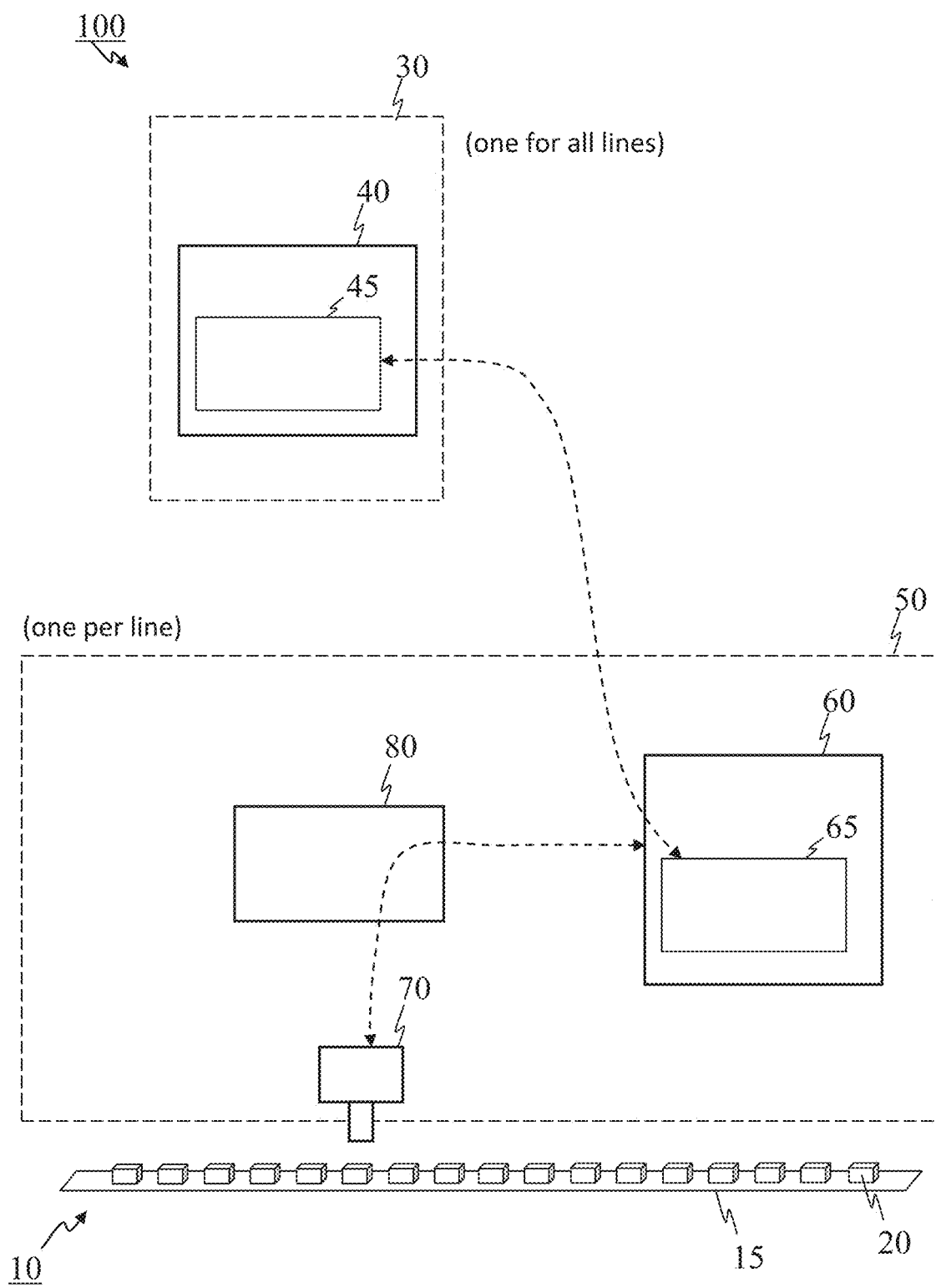
FIG. 1 schematically illustrates a system for controlling a production and/or distribution line in one embodiment of the invention.

FIG. 1 schematically illustrates a system 100 for controlling a plurality of lines 10, wherein each line 10 is a production line, a distribution line, or both a production and distribution line. For the sake of clarity, only one line 10 is illustrated in FIG. 1. Line 10 carries items 20, i.e. objects or articles, for example on a conveyor 15, i.e. items 20 are moved by means of conveyor 15.

Item 20 may for example be, without being limited to, a bottle or can of beer, wine, liquor or soft-drink, a pack, packet or box of cigarettes or cigars, a medicine pack, a bottle of perfume, or any other excisable goods, a banknote, a value paper, an identity document, a card, ticket, label, banderol, security foil, security thread or the like. Item 20 may bear, on at least one part, surface or side thereof, a visible or invisible machine-readable code printed with a printing ink. The machine-readable code may be printed on a label apposed on item 20 or printed directly on item 20 (such as on a cap, capsule or the like of item 20). The machine-readable code may for example be a linear barcode or a matrix barcode, such as a OR code or Data Matrix. The machine-readable codes are typically used for identification and/or authentication of items 20.

System 100 comprises a first subsystem 30, here referred to as "master room subsystem" 30, comprising a first control device 40 hosting an OPC UA server 45. OPC UA is a known standard specification for manufacturer-independent communication, in particular in process automation, specified by the OPC Foundation, headquartered in Scottsdale, Ariz., USA. In one embodiment, the master room subsystem 30 is configured for powering each field device 70.

In addition, there is, per line 10, a second subsystem 50, here referred to as "line control subsystem" 50, that comprises a second control device 60, at least one field device 70, and a connection device 80. Although not illustrated in FIG. 1, line control subsystem 50 may comprise a plurality of field devices 70, such as for example two, three, four, five, ten, or twenty field devices 70.

An OS is running on second control device 60, such as for example Windows Embedded Standard 7. In addition, second control device 60 hosts an OPC UA client 65. In one embodiment, second control device 60 comprises a computer, a printer, or a camera. In one embodiment, second control device 60 has capabilities to decode a machine-readable representation of a code. In one embodiment, second control device 60 has linear barcode recognition capabilities and/or two-dimensional barcode recognition capabilities. In one embodiment, second control device 60 has Data Matrix code recognition capabilities. In one embodiment, second control device 60 is configured for monitoring field device(s) 70 and generating an alarm upon detecting that a field device 70 is in an abnormal state. Second control device 60 may for example be a portable or pocket-sized device, rather than a rack-mounted system.

Second control device 60 may comprise controlling means for remotely controlling the operation of field device(s) 70 (e.g., adjusting parameters thereof, or treating image data therefrom), or for controlling the entire track and trace solution implemented for line 10. In one embodiment, second control device 60 is not a programmable logic controller (PLC). In one embodiment, the master room subsystem 30 is also configured for powering second control device 60.

In one embodiment, a field device 70 comprises a reader arranged for reading a machine-readable representation of a code. The reader may for example comprise one or more image sensors and is configured to acquire an image of an item 20 carried by line 10. In one embodiment, the reader comprises one or more array CCD or CMOS detectors to record the intensity distribution of incident electromagnetic energy. In one embodiment, the reader comprises a camera. In one embodiment, the reader is positioned on line 10 after, such as immediately after, a printer arrangement (not illustrated on FIG. 1), so as to ensure the decodability of a printed machine-readable code, i.e. checking its quality.

Connection device 80 is arranged for allowing communication between field device(s) 70 and second control device 60. Each field device 70 is connected to connection device 80 through a point-to-point digital communication interface, with connection device 80 having one physical port per field device 70, and therefore dedicated wirings per field device 70. In one embodiment, the point-to-point digital communication interface is an IO-Link or IO-Link-compatible interface. For information about IO-Link, see for example IO-Link Interface and System Specification V1.1.2, July 2013, published by IO-Link Community, based in Karlsruhe, Germany (retrievable, as of Dec. 23, 2016, from hftp://www.io-link.comishare/Downloads/Spec-Interface/IOL-Interface-Spec_10002_V112_Jul13.pdf).

The control typically performed in the prior art by a PLC set is distributed, in the architecture of the embodiment illustrated by FIG. 1, between first control device 40 and second control device 60, which may be a smart camera. Therefore, there is no need to have a cabinet on the line 10, and less space and wiring is required. As second control device 60, a smart camera may be used to replace the prior art PLC set. Since a smart camera typically has no input/output cards (in contrast to PLCs), connection device 80 acting as IO-Link master is used, on the one hand, to interface with the input/output cards and IO-Link devices 70 and, on the other hand, to send information over the network to the smart camera. As smart camera, a NEON-1020 smart camera from ADLINK Technology Inc., headquartered in Taipei, Taiwan, may for example be used (the data sheet for that product is available, as of Dec. 23, 2016, from http://www.adlinktech.com/PD/markGting/Datasheet/NEON-1020/NEON-1020_Datasheet_en_1.pdf).

The combined use of (i) OPC UA for communicating between first control device 40 and second control device 60, and (ii) a point-to-point digital communication interface, such as IO-Link, for the communication towards the field devices 70, is particularly advantageous. It facilitates the communication between the master room's first control device 40 and the plurality of second control devices 60 (one per line), while at the same shielding the second control device 60 (which may be a smart camera, as mentioned above) from the physical wiring interface towards the individual field devices 70, The system is consequently simpler and less onerous as a control cabinet and a PLC per line are not necessary. It is also easy to configure the system, such as for example to implement changes in all lines 10 simultaneously, and it is more convenient to run diagnosis for field devices 70 on the lines 10.

Additional elements (not shown in FIG. 1) may also be provided such as: a) an electromagnetic radiation source for illuminating item 20, such as for example a light source, an IR radiating source, and/or an UV radiating source, wherein the electromagnetic radiation source may for example be arranged next to the above-referred field device's 70 reader; and b) outputting and inputting means for providing information to and receiving information from an operator, such as a display screen, a keyboard, push-buttons, control knobs, LED indicator lights, etc. (in that respect, see also FIG. 5 and the corresponding description).

In one embodiment (not illustrated in FIG. 1), for at least one line 10, line control subsystem 50 comprises a field device being an encoder, and the first control device 40 is configured for supplying codes to the encoder through the connection device 80.

In one embodiment, system 100, as illustrated by FIG. 1, is a control architecture involving: a) a second control device 60 per line 10, the second control device 60 acting as dedicated controller (i.e., local control module or LCM) for the line 10; b) an IO-Link system per line 10, for enabling the exchange of information between field device(s) 70 being IO-Link device(s) or the like and second control device 60 through connection device 80 hosting an IO-Link master or the like; and c) an OPC-UA-based communication between first control device 40 hosting an OPC UA server 45 and second control device 60 hosting an OPC UA client 65, so as to monitor line 10, such as for example to manage alarms, Second control device 60 has an OS running thereon and may have a Data Matrix recognition library (i.e. Data Matrix recognition capabilities). Connection device 80 hosts an IO-Link master and has an EtherNet/IP interface (for more information about EtherNet/IP see for example EtherNet/IP™-CIP on Ethernet Technology, Technology Overview Series, PUB00138R6, ODVA, Michigan, USA, March 2016, retrieved on Nov. 15, 2016 from https://www.odva.org/Portals/0/Library(Publications_Numbered/PUB00138R6_Tech-Series-EtherNetIP.pdf) or an EtherCAT interface, to communicate with field device(s) 70 (using IO-Link) and with second control device 60 (using EtherNet/IP). First control device 40 hosts an OPC UA server 45 and comprises a local (i.e., line-specific) supervisory system (see FIG. 4, box "MASTER", sub-box "Supervisory") to monitor field device data, network links, and to generate alarms and adjust the peripheral devices, e.g., cameras, printers, etc. The OPC UA server 45 exposes information that OPC UA client 65 operated by a user may then use.

Figure 2:
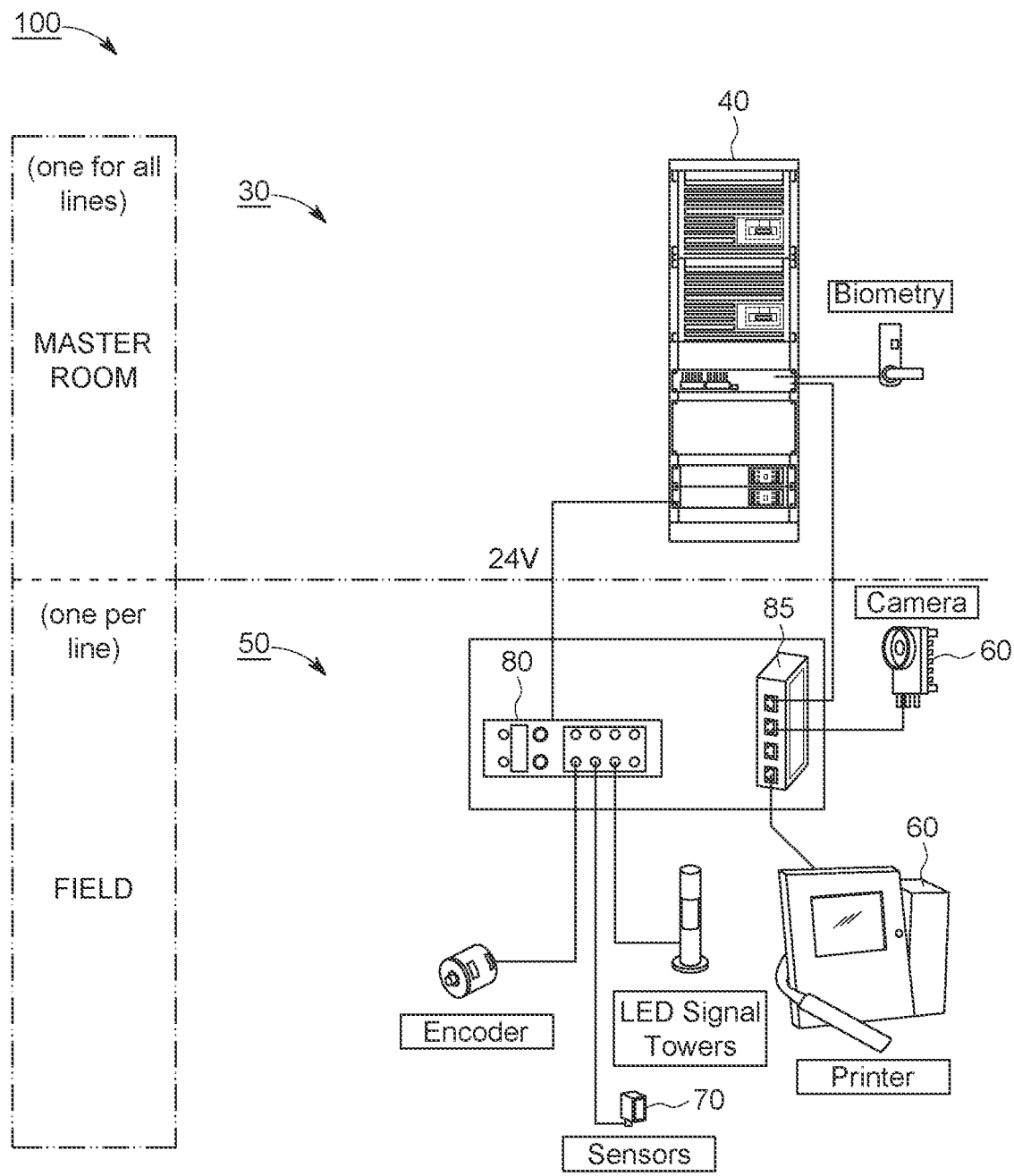
FIG. 2 schematically illustrates the hardware architecture of a system for controlling a production and/or distribution line in one embodiment of the invention.

FIG. 2 schematically illustrates the hardware architecture of a system 100 for controlling a production and/or distribution line 10, in one embodiment of the invention. System 100 comprises a line control subsystem 50 (i.e., the so-called "slave" part of system 100) in the field (i.e. in the vicinity of the line, near the sensors, etc.), which is installed per line 10, and a master room subsystem 30 comprising a hardware rack located in a master room, which is used for a plurality of lines 10. Master room subsystem 30 powers the field device(s) 70 through connection device 80, and communicates with second control device 60 through Ethernet network switch 85. Although FIG. 2 shows two second control devices 60, the presence of a single one is sufficient.

Figure 3:
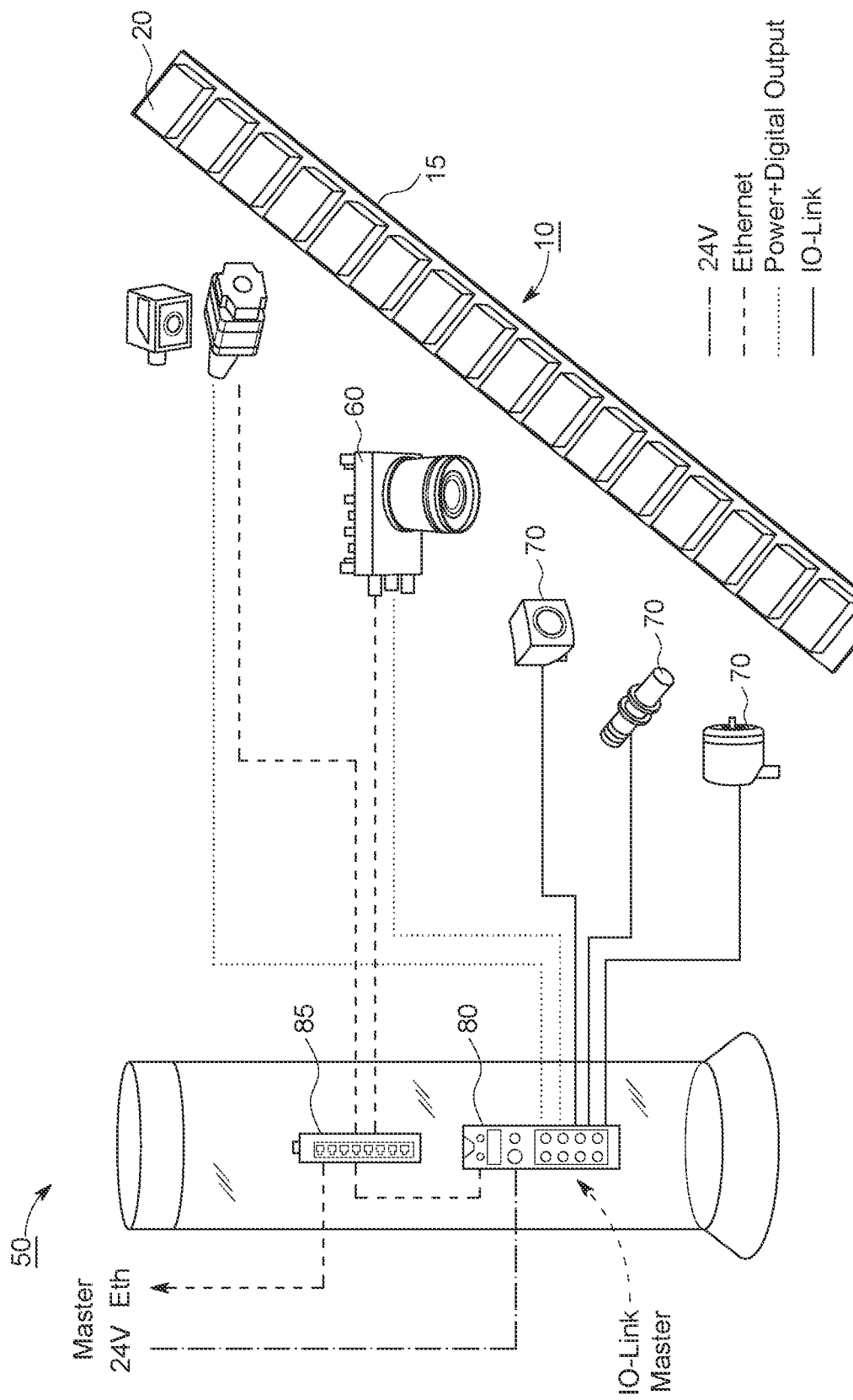
FIG. 3 schematically illustrates the structure of a line control subsystem of a system in one embodiment of the invention.

FIG. 3 schematically illustrates the structure of a line control subsystem 50 of a system 100 for controlling a production and/or distribution line 10 in one embodiment of the invention. In other words, this is the so-called "slave" part of system 100, this part being also called the line control module (LCM), Line control subsystem 50 comprises:

(i) a second control device 60 (such as e.g. a smart camera, a smart printer, or a small industrial computer) on which an OS runs and which has a Data Matrix recognition library (i.e. Data Matrix recognition capabilities);

(ii) IO-Link or IO-Link compatible sensors 70 and optionally encoders 70, i.e. IO-Link or IO-Link compatible field devices 70;

(iii) a connection device 80 acting as IO-Link master, with EtherNet/IP or EtherCAT interface, which operates as an input/output card interface towards the IO-Link or IO-Link compatible sensors and encoders to check for example whether a sensor 70 is disconnected or has a fault condition such as short circuit or, in the case of optical sensor, if it is dirty or not. An IO-Link connection is an open, serial, bi-directional, point-to-point digital connection for signal transmission and energy supply under any networks. Connection device 80 also enables the communication with smart device 60; and (iv) an Ethernet network switch 85 to send information via the network to the master room subsystem 30 (i.e., the master).

The master, or master room subsystem 30, may for example be located in a closed room in a factory and may be responsible for distributing the energy 24 Vcc and 220 Vac and printer codes to the modules on the field. Its hardware structure may be a conventional rack computer with redundant power supply and CPU. The master room subsystem 30 organizes and stores the production data (counters, printer codes) using a service-oriented architecture (SOA) software, such as e.g. Apache ServiceMix, to implement the communication between with all LCM at same time. It communicates with all LCM using SSL (Secure Sockets Layer) to ensure a secure communication for the line production data and has a local supervisory system based on OPC UA. It communicates with each second control device 60 (e.g., a smart camera or printer with an OS, or a computer) to manage the alarms and to configure the lines 10 remotely. The supervisory may be multiplatform and may have an unlimited number of clients executing the same computer program code (such as, an Android app, an internet browser page, etc.).

For the real-time control, a CODESYS runtime environment may be used with an OPC UA driver to handle the inputs and outputs of the IO-Link master connection device 80 communicating with the smart device 60 via a network such as an EtherCAT- or EtherNet/IP-based network.

Figure 4:
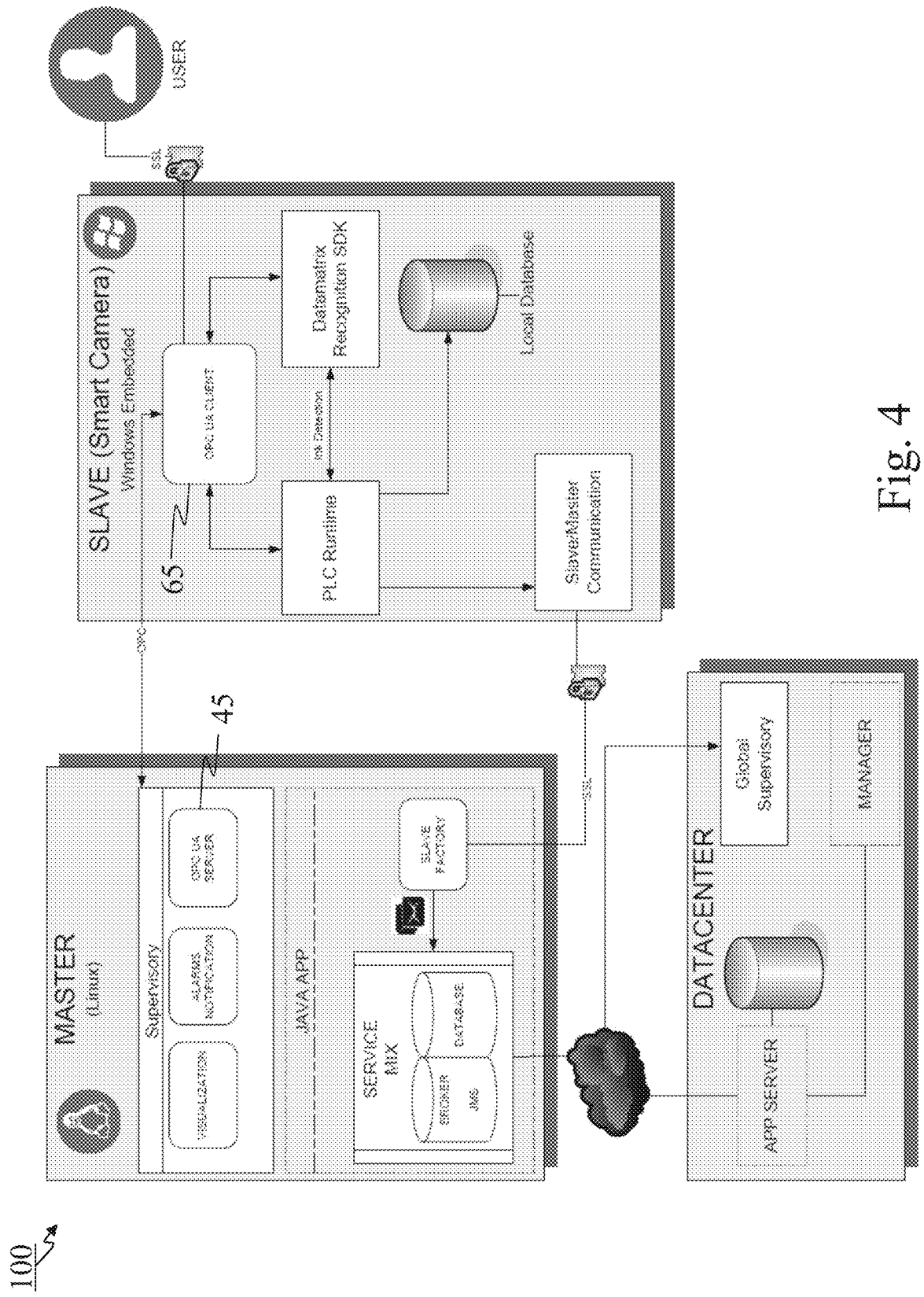
FIG. 4 schematically illustrates, from a functional and software point of view, a control architecture of a system for controlling a production and/or distribution line in one embodiment of the invention.

FIG. 4 schematically illustrates, from a functional and software point of view, an exemplary control architecture of a system 100 for controlling a production and/or distribution line 10 in one embodiment of the invention.

Figure 5:
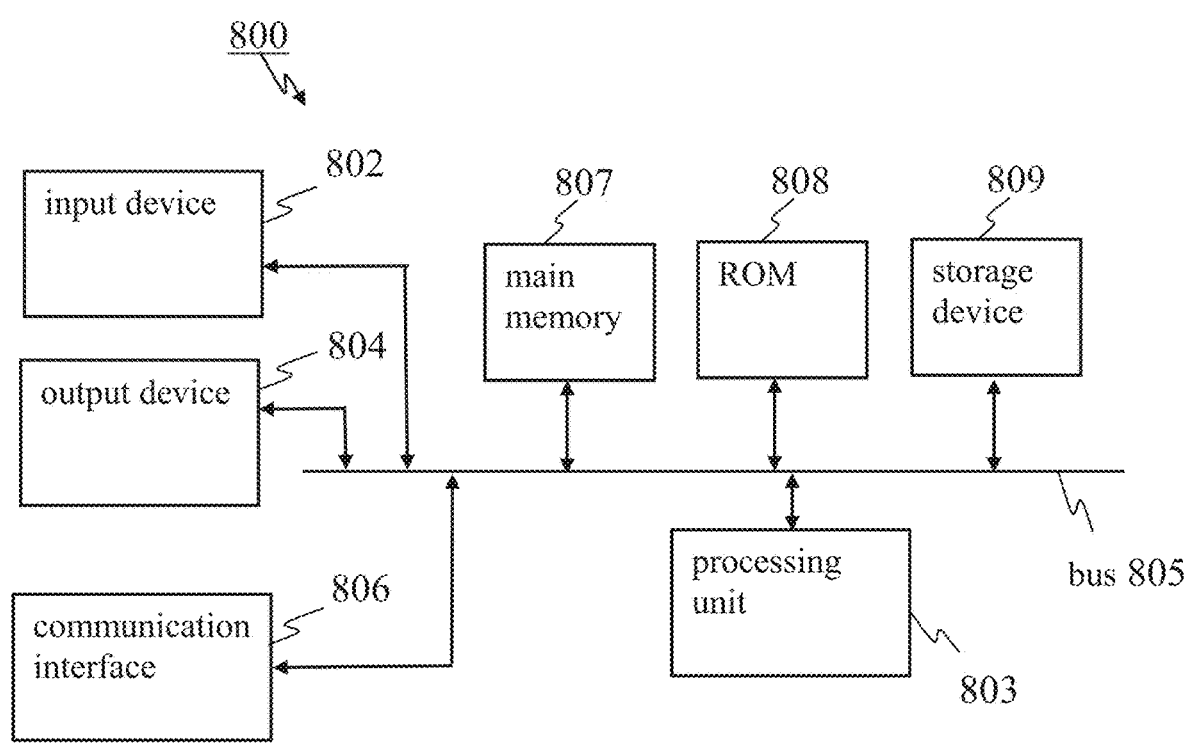
FIG. 5 is a schematic diagram of an exemplary implementation of a computing unit in one embodiment of the invention.

FIG. 5 is a schematic diagram of an exemplary implementation of a computing unit 800 that may be used for example in a second control device 60, in a method or system according to the invention.

As illustrated by FIG. 5, a computing unit 800 may include a bus 805, a processing unit 803, a main memory 807, a ROM 808, a storage device 809, an input device 802, an output device 804, and a communication interface 806. Bus 805 may include a path that permits communication among the components of computing unit 800.

Processing unit 803 may include a processor, a microprocessor, or processing logic that may interpret and execute instructions. Main memory 807 may include a RAM or another type of dynamic storage device that may store information and instructions for execution by processing unit 803. ROM 808 may include a ROM device or another type of static storage device that may store static information and instructions for use by processing unit 803. Storage device 809 may include a magnetic and/or optical recording medium and its corresponding drive.

Input device 802 may include a mechanism that permits an operator to input information to processing unit 803, such as a keypad, a keyboard, a mouse, a pen, voice recognition and/or biometric mechanisms, etc. Output device 804 may include a mechanism that outputs information to the operator, including a display, a printer, a speaker, etc. Communication interface 806 may include any transceiver-like mechanism that enables computing unit 800 to communicate with other devices and/or systems (such as with a base station, a WLAN access point, etc.). For example, communication interface 806 may include mechanisms for communicating with another device or system via a network.

Computing unit 800 may perform certain operations or processes described herein. These operations may be performed in response to processing unit 803 executing software instructions contained in a computer-readable medium, such as main memory 807, ROM 808, and/or storage device 809, A computer-readable medium may be defined as a physical or a logical memory device. For example, a logical memory device may include memory space within a single physical memory device or distributed across multiple physical memory devices. Each of main memory 807, ROM 808 and storage device 809 may include computer-readable media. The magnetic and/or optical recording media (e.g., readable CDs or DVDs) of storage device 809 may also include computer-readable media. The software instructions may be read into main memory 807 from another computer-readable medium, such as storage device 809, or from another device via communication interface 806.

The software instructions contained in main memory 809 may cause processing unit 803 to perform operations or processes described herein, such as for example decoding a machine-readable code. Alternatively, hardwired circuitry may be used in place of or in combination with software instructions to implement processes and/or operations described herein. Thus, implementations described herein are not limited to any specific combination of hardware and software.

Any one of the above-referred elements may be implemented in hardware, software, field-programmable gate array (FPGA), application-specific integrated circuit (ASICs), firmware or the like.

Although the present invention has been described on the basis of detailed examples, the detailed examples only serve to provide the skilled person with a better understanding, and are not intended to limit the scope of the invention. The scope of the invention is much rather defined by the appended claims.

ABBREVIATIONS

ASICs application-specific integrated circuit
CCD charge-coupled device
CMOS complementary metal-oxide-semiconductor
FPGA field-programmable gate array
IR infrared
LCM local control module
LED light-emitting diode
OPC Open Platform Communications
OPC UA OPC Unified Architecture
OS operating system
PLC programmable logic controller
RAM random-access memory
RFID radio-frequency identification
ROM read-only memory
SKU stock keeping unit
SOA service-oriented architecture
SSL. Secure Sockets Layer
UV ultraviolet
WLAN wireless local area network

The invention claimed is:

1. A system for controlling a plurality of lines, wherein each line is at least one of a production line and a distribution line, the system comprising:
   a master room subsystem, comprising a first control device hosting an OPC UA server; and,
   for each line, a line control subsystem,
   wherein the line control subsystem comprises:
      a second control device per line, on which an operating system is running, the second control device hosting an OPC UA client for OPC-UA-based communicating with the first control device via the OPC UA server, wherein the second control device is not a programmable logic controller, wherein the second control device is a smart camera;
      at least one field device; and
      a connection device per line,
   wherein the at least one field device communicates with the second control device via the connection device, wherein the at least one field device is connected to the connection device through a point-to-point digital communication interface and the connection device has one port per field device,
   wherein the connection device has an EtherNet/IP interface or an EtherCAT interface to communicate with the second control device via a network, and
   wherein the second control device has a Data Matrix recognition SDK and a PLC runtime environment to handle inputs and outputs of the connection device.

2. The system according to claim 1, wherein the second control device has capabilities to decode a machine-readable representation of a code.

3. The system of claim 2, wherein the second control device has at least one of linear barcode recognition capabilities and two-dimensional barcode recognition capabilities.

4. The system according to claim 1, wherein the point-to-point digital communication interface is an IO-Link or IO-Link-compatible interface.

5. The system according to claim 1, wherein the second control device is configured for monitoring the at least one field device and generating an alarm upon detecting that a field device is in an abnormal state.

6. The system according to claim 1, wherein the master room subsystem is configured for powering each field device through the connection device.

7. The system according to claim 1, wherein, for at least one line,
the line control subsystem comprises a field device being an encoder, and
the first control device is configured for supplying codes to the encoder through the connection device.

8. The system according to claim 1, wherein the master room subsystem communicates with each line control subsystem using SSL (Secure Sockets Layer) to ensure a secure communication.

9. The system according to claim 1, wherein the second control device comprises a local database in communication with the PLC runtime environment.

10. The system according to claim 1, wherein the PLC runtime environment communicates with the OPC UA client and the Datamatrix Recognition SDK, and the Datamatrix Recognition SDK communicates with the OPC UA client.

11. A method for controlling a plurality of lines, wherein each line is at least one of a production line and a distribution line, the method comprising operating:
a master room subsystem, comprising a first control device hosting an OPC UA server; and,
further operating
for each line, a line control subsystem, comprising:
a second control device per line, on which an operating system is running, the second control device hosting an OPC UA client for OPC-UA-based communicating with the first control device via the OPC UA server, wherein the second control device is not a programmable logic controller, wherein the second control device is a smart camera;
at least one field device; and
a connection device per line,
wherein the at least one field device communicates with the second control device via the connection device,
wherein the at least one field device is connected to the connection device through a point-to-point digital communication interface and the connection device has one port per field device,
wherein the connection device has an EtherNet/IP interface or an EtherCAT interface to communicate with the second control device via a network, and
wherein the second control device has a Data Matrix recognition SDK and a PLC runtime environment to handle inputs and outputs of the connection device.

12. The method of claim 11, wherein the point-to-point digital communication interface is an IO-Link or IO-Link-compatible interface.

13. The method of claim 12, wherein the second control device monitors the at least one field device and generates an alarm upon detecting that a field device is in an abnormal state.

14. The method according to claim 11, wherein the master room subsystem powers each field device through the connection device.

15. The method according to claim 11, wherein, for at least one line, the line control subsystem comprises a field device being an encoder, and the first control device supplies codes to the encoder through the connection device.

* * * * *